(12) United States Patent
Liang et al.

(10) Patent No.: US 9,151,439 B2
(45) Date of Patent: Oct. 6, 2015

(54) SUPPORT FOR PORTABLE COMPUTING DEVICE

(75) Inventors: Yong Liang, Shenzhen (CN); Lin-Lin Pan, Shenzhen (CN); Chia-Te Yu, New Taipei (TW); Liang-Yi Lu, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 133 days.

(21) Appl. No.: 13/535,716

(22) Filed: Jun. 28, 2012

(65) Prior Publication Data
US 2013/0168288 A1   Jul. 4, 2013

(30) Foreign Application Priority Data

Dec. 28, 2011  (CN) .......................... 2011 1 0447048

(51) Int. Cl.
| F16M 11/38 | (2006.01) |
| F16M 13/00 | (2006.01) |
| E05D 11/10 | (2006.01) |
| A47B 23/04 | (2006.01) |
| F16M 11/04 | (2006.01) |
| F16M 11/10 | (2006.01) |

(52) U.S. Cl.
CPC .............. *F16M 11/38* (2013.01); *A47B 23/043* (2013.01); *E05D 11/1028* (2013.01); *E05D 11/1078* (2013.01); *F16M 11/046* (2013.01); *F16M 11/10* (2013.01); *F16M 13/00* (2013.01); *E05D 2011/1035* (2013.01); *F16M 2200/024* (2013.01); *Y10T 16/54028* (2015.01); *Y10T 16/540256* (2015.01)

(58) Field of Classification Search
CPC .......... A47B 2023/049; A47B 23/043; F16M 11/00; F16M 11/38; F16M 13/00; F16M 2200/024; E05D 11/1028; E05D 11/1078; E05D 2011/1035; Y10T 16/540254; Y10T 16/540256; Y10T 16/540257; Y10T 16/54028
USPC .............. 248/923, 917, 918, 919, 441.1, 444, 248/445, 448, 454, 455, 457, 459, 460, 461, 248/462, 446, 188.2, 447, 442.2, 371, 456, 248/463; 16/332, 334, 374, 276.33, 331, 16/276, 330; 403/92, 93, 96
See application file for complete search history.

(56) References Cited

U.S. PATENT DOCUMENTS

| 5,109,572 | A  | * | 5/1992  | Park ................................ 16/334 |
| 5,639,053 | A  | * | 6/1997  | Dmitriev ....................... 248/460 |
| 6,665,906 | B2 | * | 12/2003 | Li ................................... 16/330 |
| 6,789,976 | B2 | * | 9/2004  | Hung et al. .................... 403/84 |
| 7,062,817 | B2 | * | 6/2006  | Lee ................................ 16/334 |
| 7,228,596 | B2 | * | 6/2007  | Kang ............................. 16/330 |

(Continued)

*Primary Examiner* — Jonathan Liu
*Assistant Examiner* — Guang H Guan
(74) *Attorney, Agent, or Firm* — Novak Druce Connolly Bove + Quigg LLP

(57) ABSTRACT

A foldable support for supporting a portable computing device includes a main frame, a back plate, and a hinge assembly connecting the back plate to the main frame, the hinge assembly being able to position and lock the back plate in a desired position with respect to the main frame. A base member is rotatably connected to a bottom of the main frame. When the portable computing device is supported by the foldable support, a back of the portable computing device rests against the main frame, and a bottom of the portable computing device rests on the base member.

4 Claims, 9 Drawing Sheets

(56) References Cited

U.S. PATENT DOCUMENTS

| | | | |
|---|---|---|---|
| 7,334,768 B1 * | 2/2008 | Lum .................... | 248/444 |
| 7,350,664 B2 * | 4/2008 | Nam et al. .................... | 220/264 |
| 7,540,466 B2 * | 6/2009 | Yang .................... | 248/688 |
| 7,614,599 B2 * | 11/2009 | Moon et al. .................... | 248/454 |
| 7,835,143 B2 * | 11/2010 | Shi et al. .................... | 361/679.01 |
| 8,246,001 B2 * | 8/2012 | Huang .................... | 248/688 |
| 8,328,153 B2 * | 12/2012 | Yang et al. .................... | 248/370 |
| 8,438,703 B2 * | 5/2013 | Tagtow et al. .................... | 16/334 |
| 8,534,635 B2 * | 9/2013 | Yang et al. .................... | 248/458 |
| 8,550,421 B2 * | 10/2013 | Liu .................... | 248/455 |
| 8,783,641 B2 * | 7/2014 | Lin et al. .................... | 248/463 |
| 2004/0211211 A1 * | 10/2004 | Nam et al. .................... | 62/440 |
| 2005/0055805 A1 * | 3/2005 | Hsu et al. .................... | 16/324 |
| 2009/0288270 A1 * | 11/2009 | Yamashita .................... | 16/239 |
| 2013/0168288 A1 * | 7/2013 | Liang et al. .................... | 206/766 |

* cited by examiner

SUPPORT FOR PORTABLE COMPUTING DEVICE

BACKGROUND

1. Technical Field

The present disclosure relates to foldable supports, and particularly, to a foldable support for supporting a portable computing device.

2. Description of Related Art

Portable computing devices, such as smart phones and tablet computers can perform complex tasks and become almost indispensable for many people. It is convenient and becoming more necessary to provide a foldable support that can provide an appropriate orientation for such portable computing devices.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described with reference to the accompanying drawings.

Figure 1:
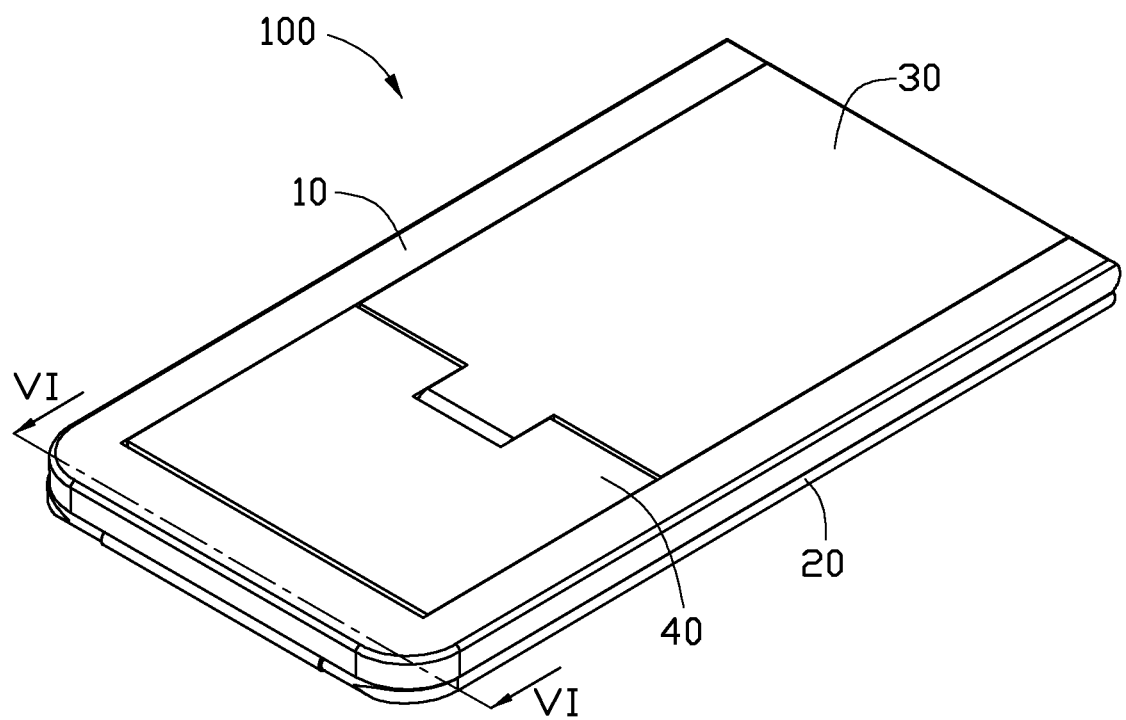
FIG. 1 is an isometric view of a foldable support in a folded state in accordance with an embodiment.
Figure 2:
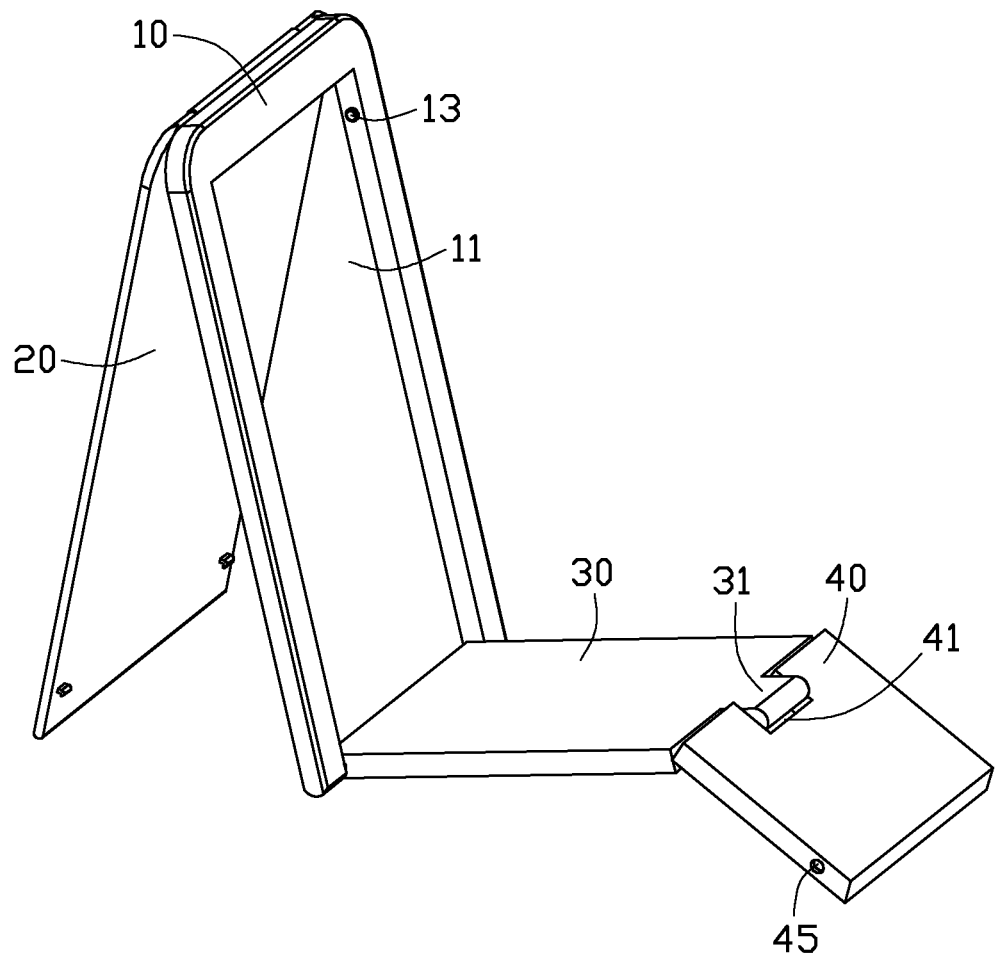
FIG. 2 is an isometric view of the foldable support of FIG. 1 in an unfolded state.

Referring to FIGS. 1 and 2, a foldable support 100 includes a main frame 10, a back plate 20, and a base member 30. When not in use, the support 100 can be folded into a flat structure as shown in FIG. 1. When in use, the support 100 can be unfolded and expanded to support a portable computing device, such as a tablet computer (not shown).

One end of the back plate 20 is rotatably connected to the top of the main frame 10. One end of the base member 30 is rotatably connected to the bottom of the main frame 10. When in use, the back plate 20 is rotated to a certain angle with respect to the main frame 10, and the lower ends of the main frame 10 and the back plate 20 are then able to rest stably on a support surface (e.g., desktop), which forms a stable support structure. The tablet computer can then be placed on the support 100, with its back abutting the main frame 10 and its bottom residing on the base member 30.

Figure 3:
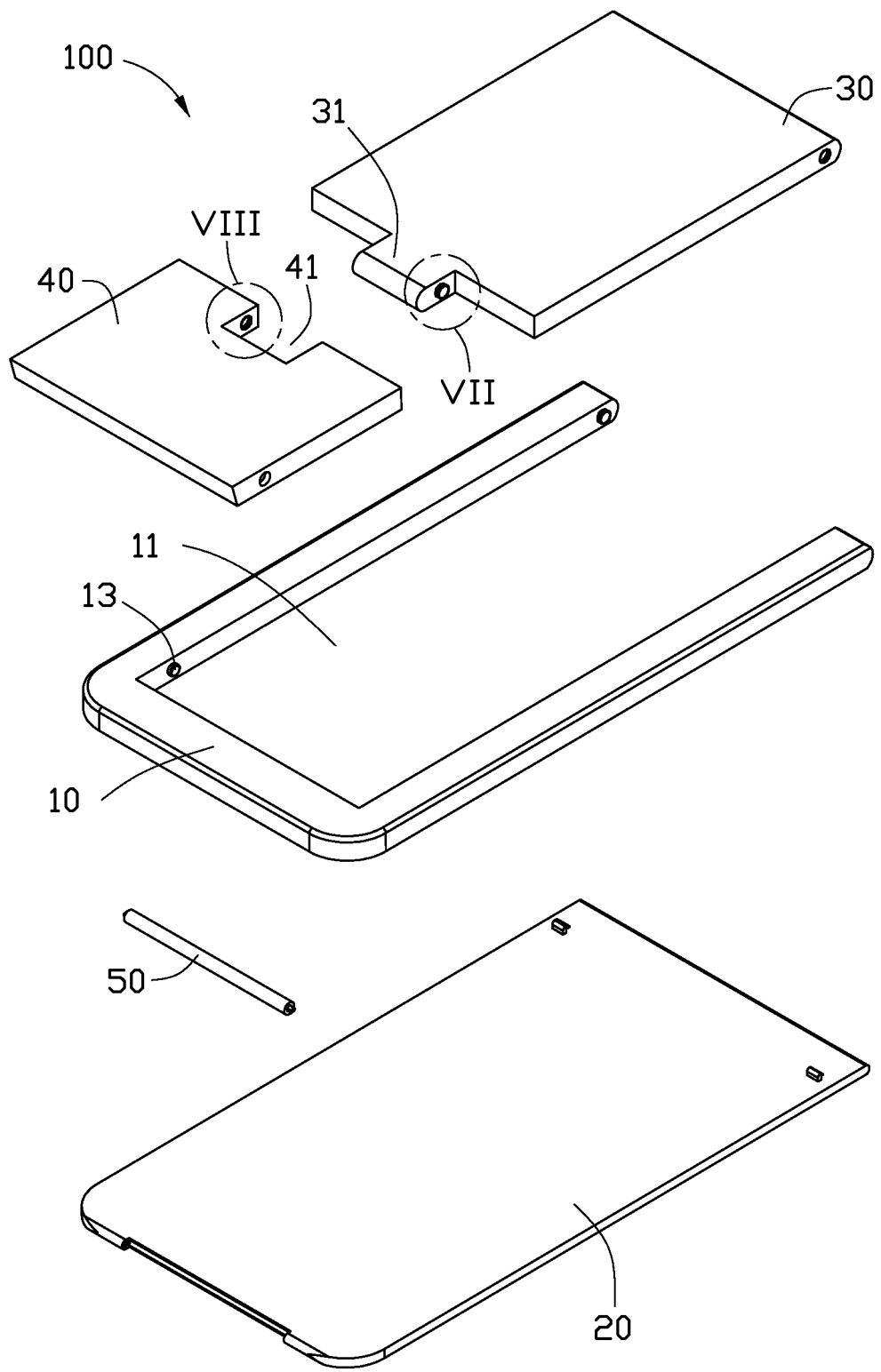
FIG. 3 is an isometric, exploded view of the foldable support of FIG. 1.
Figure 4:
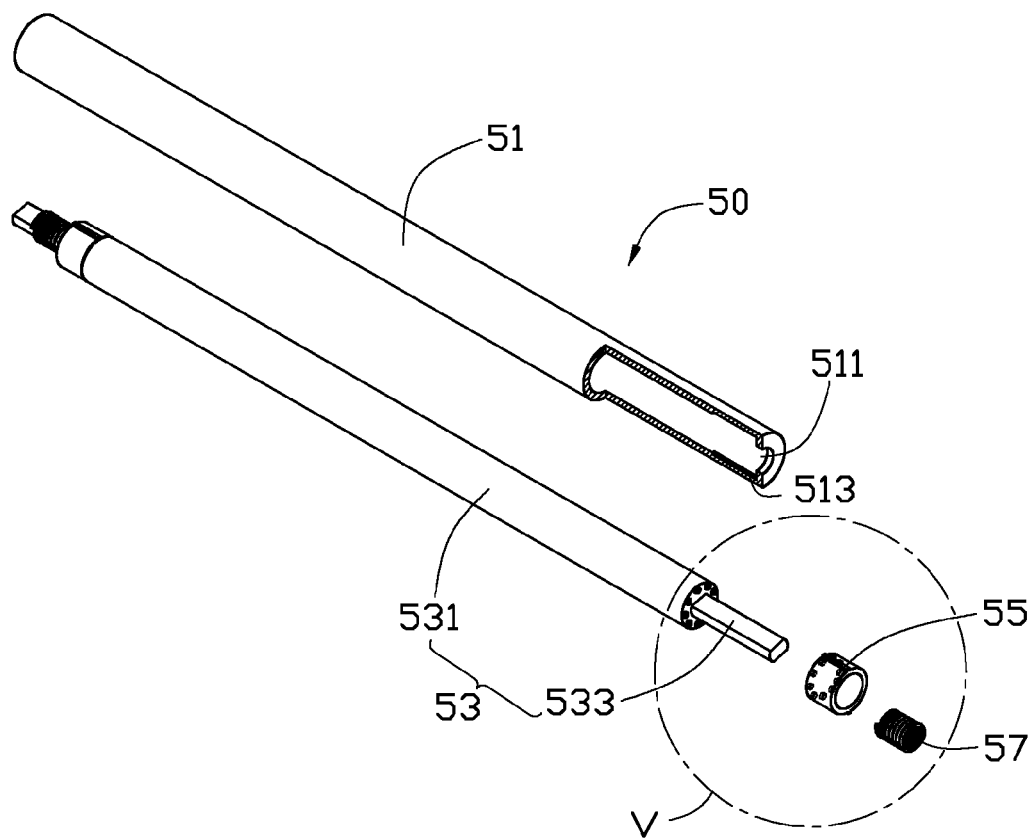
FIG. 4 is an isometric, exploded view of a hinge assembly of the foldable support of FIG. 1.

Referring to FIGS. 3-4, the back plate 20 is rotatably connected to the main frame 10 via a hinge assembly 50. The hinge assembly 50 includes a barrel 51, a shaft 53, two positioning blocks 55, and two elastic members 57. The barrel 51 is securely connected to the top of the main frame 10. The barrel 51 defines two through holes 511 at opposite ends.

Figure 5:
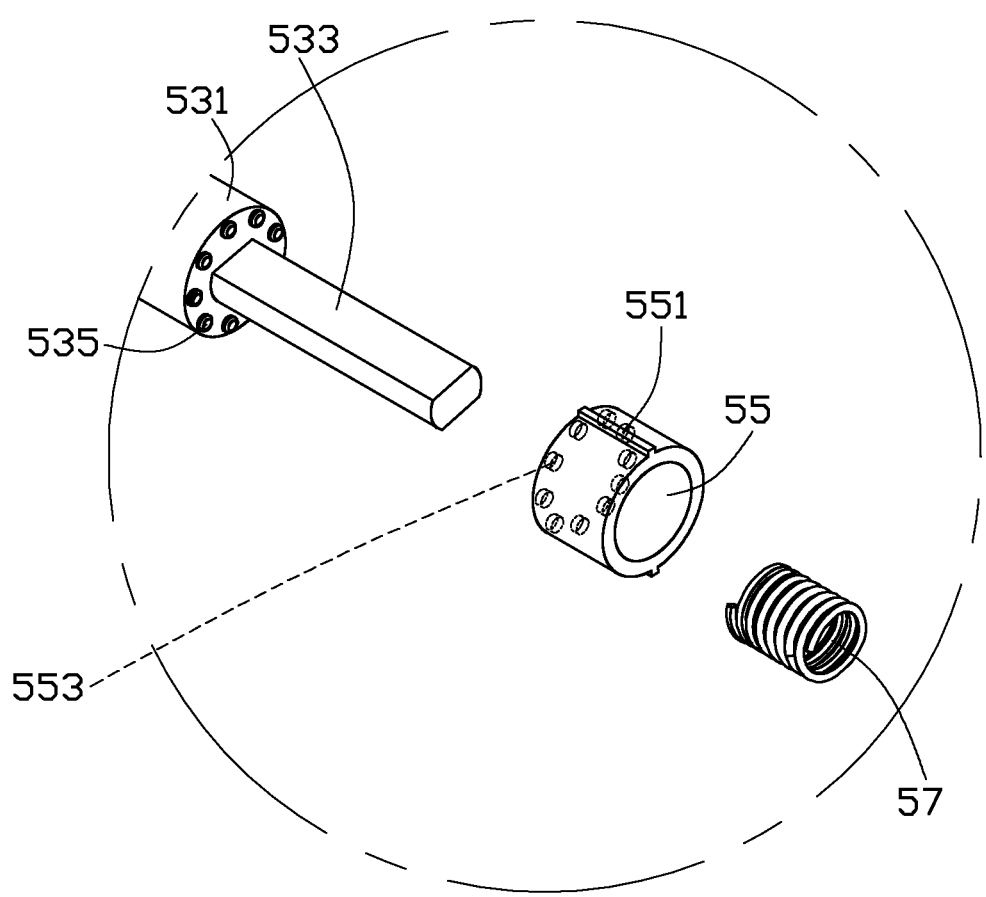
FIG. 5 is an enlarged view of the portion V of FIG. 4.
Figure 6:
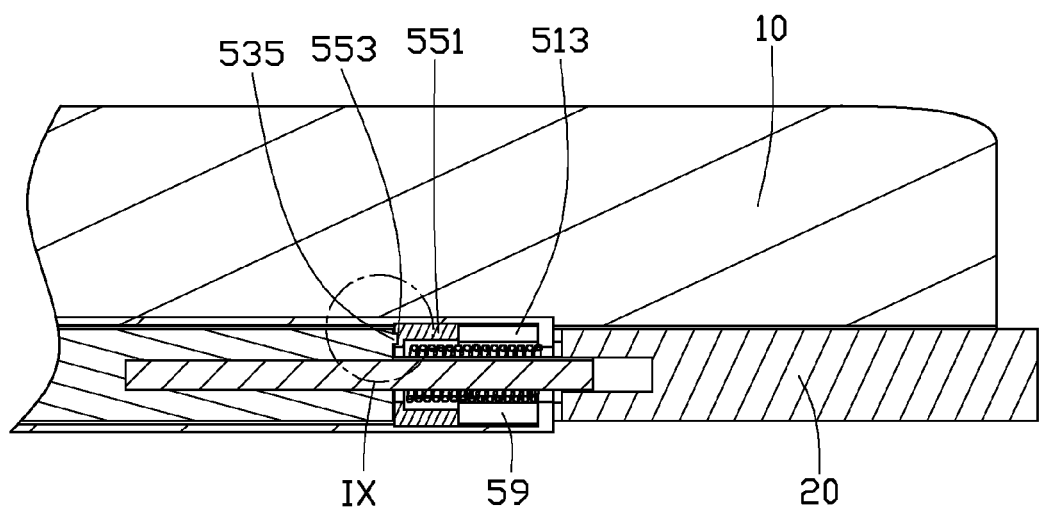
FIG. 6 is a cross-sectional view of the foldable support of FIG. 1 along lines VI-VI of FIG. 1.

Referring to FIGS. 5-6, the shaft 53 includes a cylindrical main body 531 and two connection portions 533 protruding from opposite ends of the main body 531. The main body 531 has a diameter slightly smaller than the inner diameter of the barrel 51, and is shorter than the barrel 51. A chamber 59 is formed between an end of the main body 531 and an end of the barrel 51. The main body 531 is received in the barrel 51. Each connection portion 533 extends out through one through hole 511 of the barrel 51, and is securely connected to the back plate 20, which allows the back plate 20 to rotate with the shaft 53.

Each positioning block 55 is a short cylindrical tube that is received in the corresponding chamber 59 and arranged around one connection portion 533 of the shaft 53. Each positioning block 55 includes a rib 551 on its outer surface extending lengthwise along the positioning block 55. The barrel 51 defines two grooves 513 in its inner, lateral surface of two ends of the barrel 51 to receive the rib 551. Each rib 551 can slide along the corresponding groove 513. Each positioning block 55 further defines a number of dents 553 that are evenly arranged around the corresponding connection portion 533. The two ends of the main body 531 that face the two positioning blocks 55 each includes a protrusion 535 that can fit into any one of the dents 553 of the corresponding positioning block 55. Each elastic member 57 is a coil spring and arranged around one corresponding connection portion 533. Opposite ends of the elastic member 57 abut the corresponding positioning block 55 and the barrel 51. Each elastic member 57 applies a push force to the corresponding positioning block 55, which causes the corresponding positioning block 55 to press against the main body 531.

Due to the pushing force of each elastic member 57, the corresponding protrusion 535 on the main body 531 of the shaft 53 is retained in one of the dents 553 of the corresponding positioning block 55, which restricts the shaft 53 from rotating with respect to the barrel 51. When adjusting the angle between the back plate 20 and the main frame 10, a user can push on the back plate 20, which causes each protrusion 535 to start moving out of the corresponding dent 553. During the motion of each protrusion 535, each positioning block 55 is pushed by the corresponding protrusion 535 and moves away from the main body 531. When each protrusion 535 moves out of the dent 553 altogether, the shaft 53 is freed from the limitation of the positioning block 55 and can rotate with respect to each positioning block 55. The user can stop pushing on the back plate 20 when the back plate 20 has rotated with the shaft 53 to a desired position. Each elastic member 57 then rebounds and pushes the corresponding positioning block 55 to press against the main body 531, which causes each protrusion 535 to be retained in a corresponding dent 553, maintaining the back plate 20 at the particular desired position.

Figure 7:
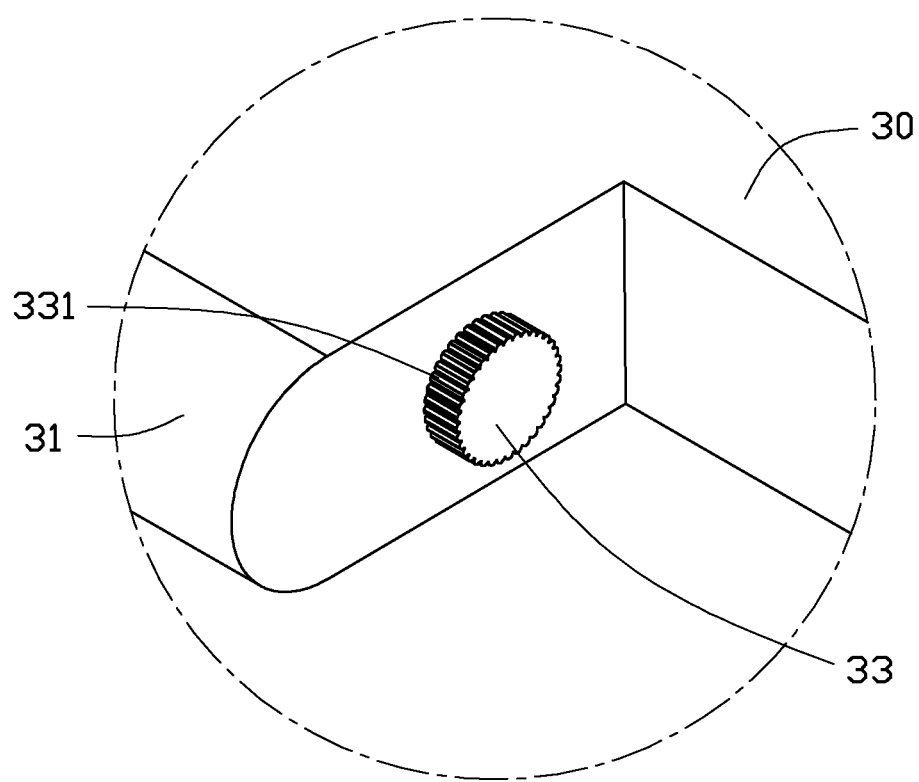
FIG. 7 is an enlarged view of the portion VII of FIG. 3.
Figure 8:
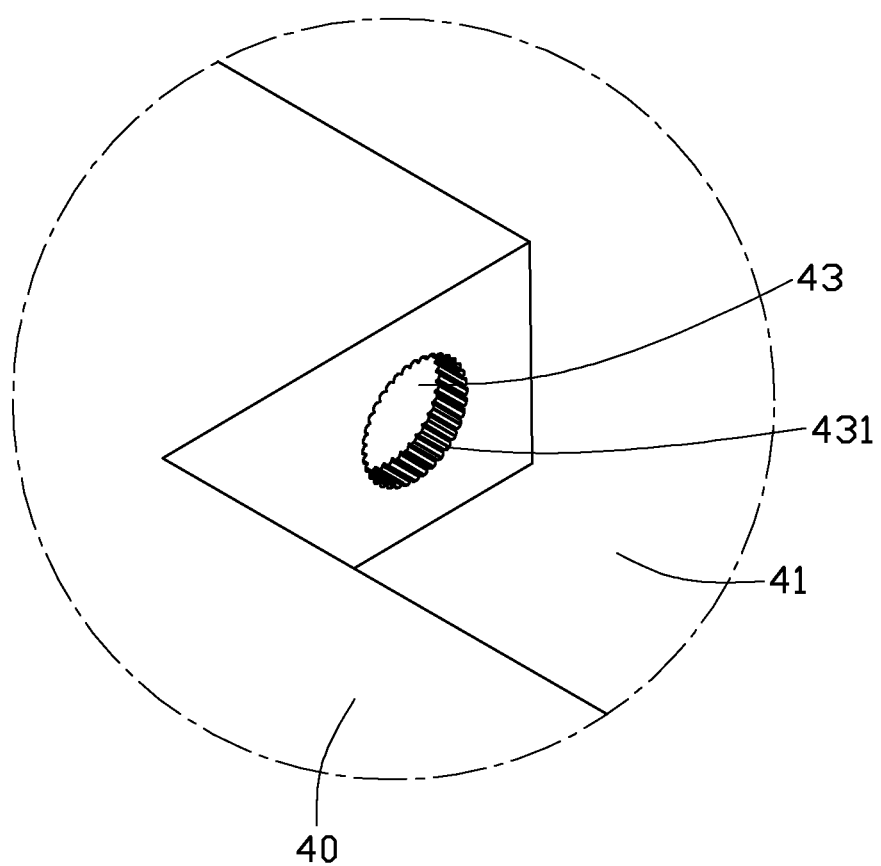
FIG. 8 is another enlarged view of the portion VIII of FIG. 3.
Figure 9:
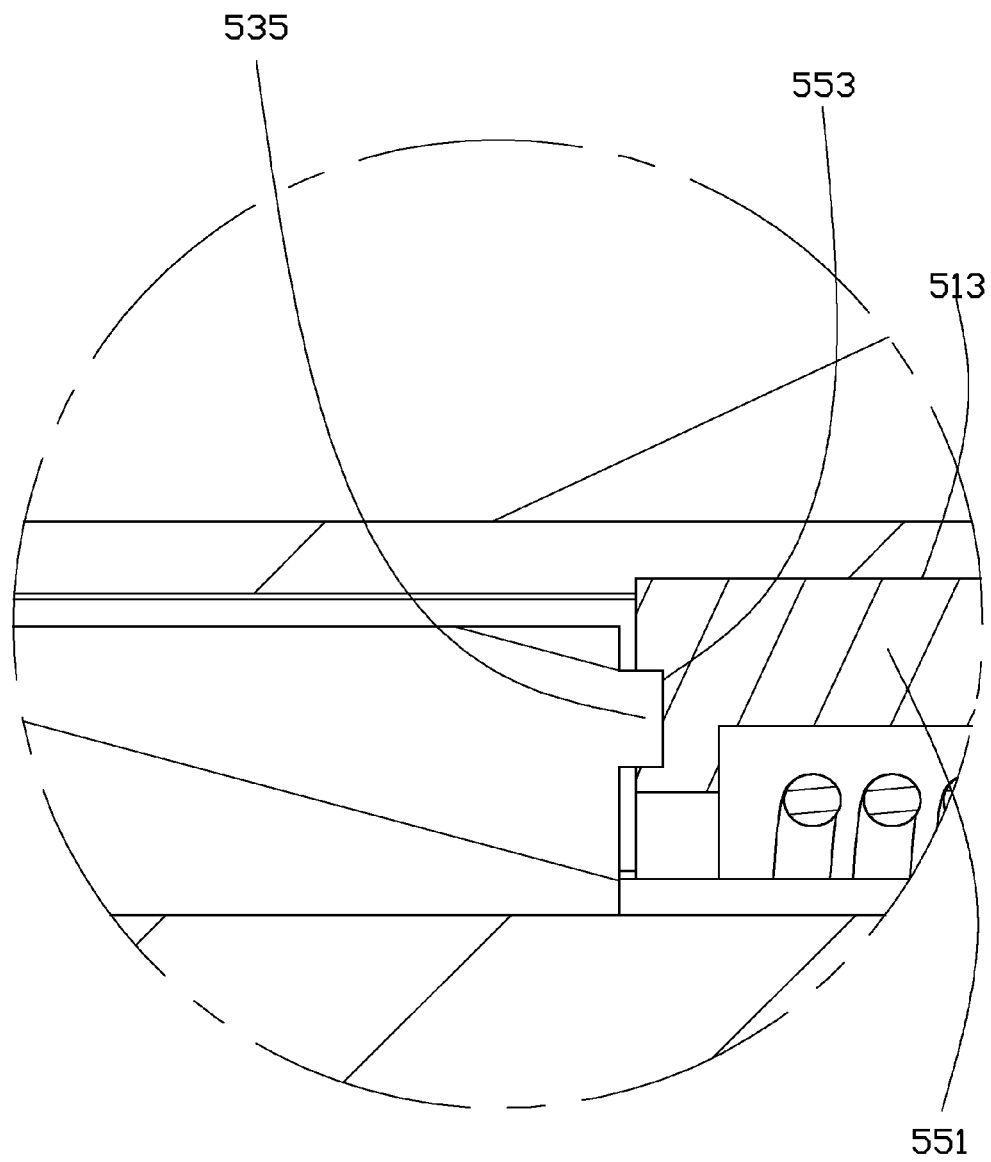
FIG. 9 is an enlarged view of portion IX of FIG. 6.

Referring to FIGS. 7 and 8, in the embodiment, the support 100 may further include an adjusting member 40 that is rotatably connected to the base member 30. One end of the base member 30 includes a protruding portion 31. The protruding portion 31 includes two pivots 33 on its opposite sides. Each of the pivots 33 includes a number of teeth 331. The adjusting member 40 includes an opening 41 in one end that receives the protruding portion 31. The adjusting member 40 further defines two pivot receiving holes 43 to receive the pivots 33, which rotatably connect the adjusting member 40 to the base member 30. The base member 30 can be connected to the main frame 10 in the same manner. Each pivot receiving hole 43 defines a number of slots 431 in its inner surface. The teeth 331 engage with the slots 431 to allow the adjusting member 40 to be maintained at a particular desired position. Thus, the adjusting member 40 can be rotated to and held at a desired position. By adjusting the angle between the base member 30 and the adjusting member 45, the distance between the tablet computer on the base member 30 and a support surface (e.g., desktop) can be adjusted.

In the embodiment, the main frame 10 is a planar structure and defines a space 11 that has a closed end and an open end. The base member 30 is connected to the main frame at the open end. The base member 30 and the adjusting member 40 can be folded into the space 11 when required. A cavity 45 is defined in a side of the adjusting member 40. The frame 10 includes a post 13 that can be received in the cavity 45 when the base member 30 and the adjusting member 40 are fitted into the space 11, which prevents the disengagement of the adjusting member 40 from the main frame 10.

While various embodiments have been described and illustrated, the disclosure is not to be construed as being limited thereto. Various modifications can be made to the embodiments by those skilled in the art without departing from the true spirit and scope of the present disclosure as defined by the appended claims.

What is claimed is:

1. A foldable support for supporting a portable computing device, comprising:
   a main frame configured to supportingly abut against a back of the portable computing device;
   a back plate;
   a hinge assembly rotatably connecting the back plate to the main frame, and to position the back plate at a desired position with respect to the main frame; and
   a base member rotatably connected to a bottom of the main frame, and configured to hold a bottom of the portable computing device to be supported, thereby cooperating with the main frame to support the portable computing device to be supported;
   whereby the hinge assembly comprises a barrel securely connected to the main frame and a shaft rotatably received in the barrel, two ends of the shaft extend out of the barrel and are securely connected to the back plate, allowing the back plate to rotate together with the shaft; and
   wherein the hinge assembly further comprises two positioning blocks and two elastic members, the shaft comprises a cylindrical main body and two connection portions respectively protruding from opposite ends of the main body, the cylindrical main body defines a uniform diameter across an entire longitudinal length of the cylindrical main body, opposite ends of the connection portions extend out of the barrel and are securely connected to the back plate, the positioning blocks are respectively arranged around the two connection portions, each of the positioning blocks comprises a rib on an outer surface thereof and a plurality of dents arranged on an end thereof and around one corresponding connection portion of the connection portions, the opposite ends of the main body respectively face the positioning blocks, each of the opposite ends of the main body comprises a protrusion configured to fit into a dent of the plurality of dents of a corresponding positioning block of the positioning blocks, the barrel defines two grooves in an inner surface of two ends thereof, the rib of each positioning block is slidably received in one of the two grooves, and each protrusion is movably received in one of the plurality of dents of the corresponding positioning block, thereby restricting the shaft from rotating, the two elastic members are respectively arranged around the two connection portions, each elastic member is configured to apply a pushing force to the corresponding positioning block, thereby causing each protrusion to be retained in one of the plurality of dents of the corresponding positioning block.

2. The foldable support according to claim 1, further comprising an adjusting member, wherein the adjusting member is rotatably connected to the base member.

3. The foldable support according to claim 2, wherein the base member comprises a protruding portion on an end thereof, the protruding portion comprises two pivots on opposite sides thereof, the adjusting member defines an opening in an end thereof and two pivot receiving holes in opposite sides of the opening, the opening receives the protruding portion, the two pivots are rotatably received in the pivot receiving holes, thereby rotatably connecting the adjusting member to the base member.

4. The foldable support according to claim 3, wherein each of the two pivots comprises a plurality of teeth on an outer surface thereof, each of the two pivot receiving holes defines a plurality of slots to engage with the teeth, thereby positioning the adjusting member at a desired position.

* * * * *